(12) United States Patent
Niitsuma et al.

(10) Patent No.: US 11,761,494 B2
(45) Date of Patent: Sep. 19, 2023

(54) DRAG WASHER AND FISHING REEL

(71) Applicant: Shimano Inc., Sakai (JP)

(72) Inventors: Akira Niitsuma, Sakai (JP); Shu Kusuda, Sakai (JP); Atsushi Yagara, Sakai (JP); Takuji Takamatsu, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/861,617

(22) Filed: Jul. 11, 2022

(65) Prior Publication Data
US 2023/0071854 A1 Mar. 9, 2023

(30) Foreign Application Priority Data
Sep. 7, 2021 (JP) .................. 2021-145431

(51) Int. Cl.
*A01K 89/01* (2006.01)
*F16D 7/02* (2006.01)
*A01K 89/027* (2006.01)

(52) U.S. Cl.
CPC ............ *F16D 7/025* (2013.01); *A01K 89/028* (2015.05)

(58) Field of Classification Search
CPC .... A01K 89/028; A01K 89/05; A01K 89/057; A01K 89/058; F16D 7/025
See application file for complete search history.

(56) References Cited

FOREIGN PATENT DOCUMENTS

| CN | 109642781 A | * | 4/2019 | ............. B32B 27/08 |
| JP | 2662735 B2 | | 10/1997 | |
| WO | WO-2018144123 A1 | * | 8/2018 | ........... A43B 1/0027 |

* cited by examiner

*Primary Examiner* — Emmanuel M Marcelo
(74) *Attorney, Agent, or Firm* — United IP Counselors, LLC

(57) ABSTRACT

A drag washer for a fishing reel has a sliding surface slidable relative to a plate washer. The drag washer includes a felt material formed by entwining a first fiber and a second fiber. The first fiber extends in a first direction along a thickness of the drag washer. The second fiber extends in a second direction along the sliding surface.

14 Claims, 6 Drawing Sheets

DRAG WASHER AND FISHING REEL

CROSS-REFERENCE TO RELATED APPLICATIONS

This application claims priority to Japanese Patent Application No. 2021-145431, filed Sep. 7, 2021. The contents of that application are incorporated by reference herein in their entirety.

TECHNICAL FIELD

The present invention relates to a drag washer and a fishing reel.

BACKGROUND ART

A drag washer for a conventional fishing reel is known to be a carbon cloth washer made of carbon fiber woven fabric or a felt washer made of entwined wool or the like (see Japanese Patent No. 2662735, for example).

Among drag washers for conventional fishing reels, a carbon cloth washer is highly durable and able to achieve high braking force. However, in a case of the carbon cloth washer, the material cost is high, and the braking force increases too much in relation to the pressing force due to high elasticity, resulting in so-called "peaky" behavior.

On the other hand, with a felt washer such as that described in Japanese Patent No. 2662735, the material cost is relatively low, and the braking force can be gradually adapted in relation to the pressing force, and thus, the felt washer is suitable for fishing that requires fine adjustment (especially for lure fishing in mountain streams using a fine fishing line). However, the felt washer is inferior in durability and prone to breaking under high load, and thus, there was a room for improvement in this respect.

The present invention has been made in consideration of such circumstances and the purpose of the present invention is to provide a drag washer and a fishing reel that are capable of achieving high durability, ensuring braking force suitable for fishing drag, and additionally reducing the cost.

BRIEF SUMMARY

A drag washer according to one aspect of the present invention is a drag washer for a fishing reel, and the drag washer has a sliding surface slidable relative to a plate washer. The drag washer includes a felt material formed by entwining a first fiber and a second fiber. The first fiber extends in a first direction along a thickness of the drag washer. The second fiber extends in a second direction along the sliding surface.

In the drag washer according to the present invention, not only the second fiber along the sliding surface, but also the first fiber intersecting with the second fiber are provided, and the felt material is formed by entwining the first fiber and the second fiber having different fiber length directions. Thus, fiber density can be increased not only in the direction along the sliding surface, but also in all directions. Therefore, even when high load is applied to the sliding surface by drag, wear against shear can be suppressed and the occurrence of breakage and damage can be reduced, thereby improving the durability as a drag washer.

Specifically, compared to a conventional drag washer in which fibers on sliding surfaces come off due to sliding as seen in a conventional case having only the second fiber arranged horizontally along the sliding surface, the drag washer of the present invention is formed by entwining the vertically arranged first fiber with the horizontally arranged second fiber, and thus, come-off of the second fiber associated with sliding can be reduced and durability can be improved.

Also, the drag washer of the present invention has the performance of a felt material, in which fine adjustment is possible by gradually adapting the braking force in relation to the pressing force. In addition, the cost can be reduced, compared to components such as a carbon cloth washer made of carbon fiber woven fabric, for example.

The length of the first fiber is preferably 0.5 mm or more.

In this case, by using the first fiber with the length of 0.5 mm or more in the fiber length direction, the first fiber is easy to entwine with the second fiber and a suitable felt material with excellent durability can be formed.

The length of the first fiber can be 0.8 mm or more.

In this case, a suitable felt material with even greater durability can be formed.

The angle of the first direction to the sliding surface can be within the range of 60° to 90°.

In this case, the first fiber entwines more easily with the second fiber, and the durability as a felt material can be more reliably demonstrated.

The first fiber can have a higher strength than the second fiber.

In this case, since the fiber direction of the first fiber intersects with the sliding direction, it is possible to compose a felt material with high durability, capable of suppressing wear by increasing the strength of the first fiber, and effective in shearing during sliding.

The first fiber and the second fiber can be a single fiber.

In this case, the first fiber and the second fiber are formed of one single fiber and the felt material can be easily manufactured by entwining the same fiber in the thickness direction by the needle-punch method, for example.

The density of the felt material can be 0.35 $g/cm^3$ or more and 0.8 $g/cm^3$ or less.

In this case, since the density of the felt material is 0.35 $g/cm^3$ or more and 0.8 $g/cm^3$ or less, it is possible to improve the wear resistance during sliding. Also, since the density of the felt material is 0.8 $g/cm^3$ or less, the felt material does not become too hard and it is possible to ensure the cushioning performance.

In a fishing reel according to one aspect of the present invention, the drag washer described above is used.

With the present invention, a fishing reel having the effect of the drag washer described above can be provided.

According to the drag washer and the fishing reel of the present invention, it is possible to achieve high durability, to ensure a braking force suitable for fishing drag, and additionally to reduce the cost.

DETAILED DESCRIPTION

Hereinafter, an embodiment of a drag washer and a fishing reel according to the present invention will be described with reference to the drawings. In each drawing, the scale of each component may be changed as needed to make each component visually recognizable.

Figure 1:
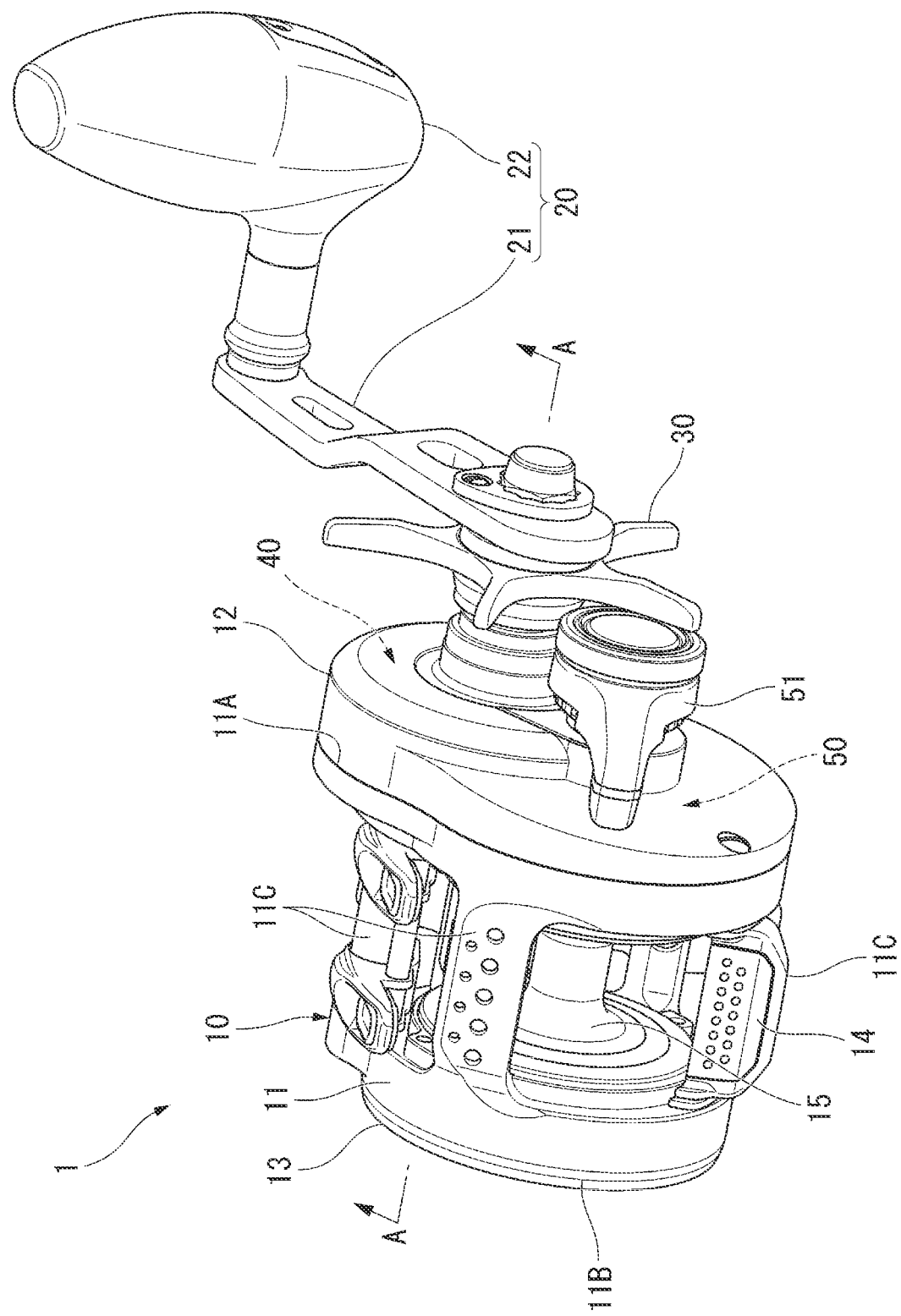
FIG. 1 is a perspective view showing the overall structure of a dual bearing reel according to an embodiment of the present invention.
Figure 2:
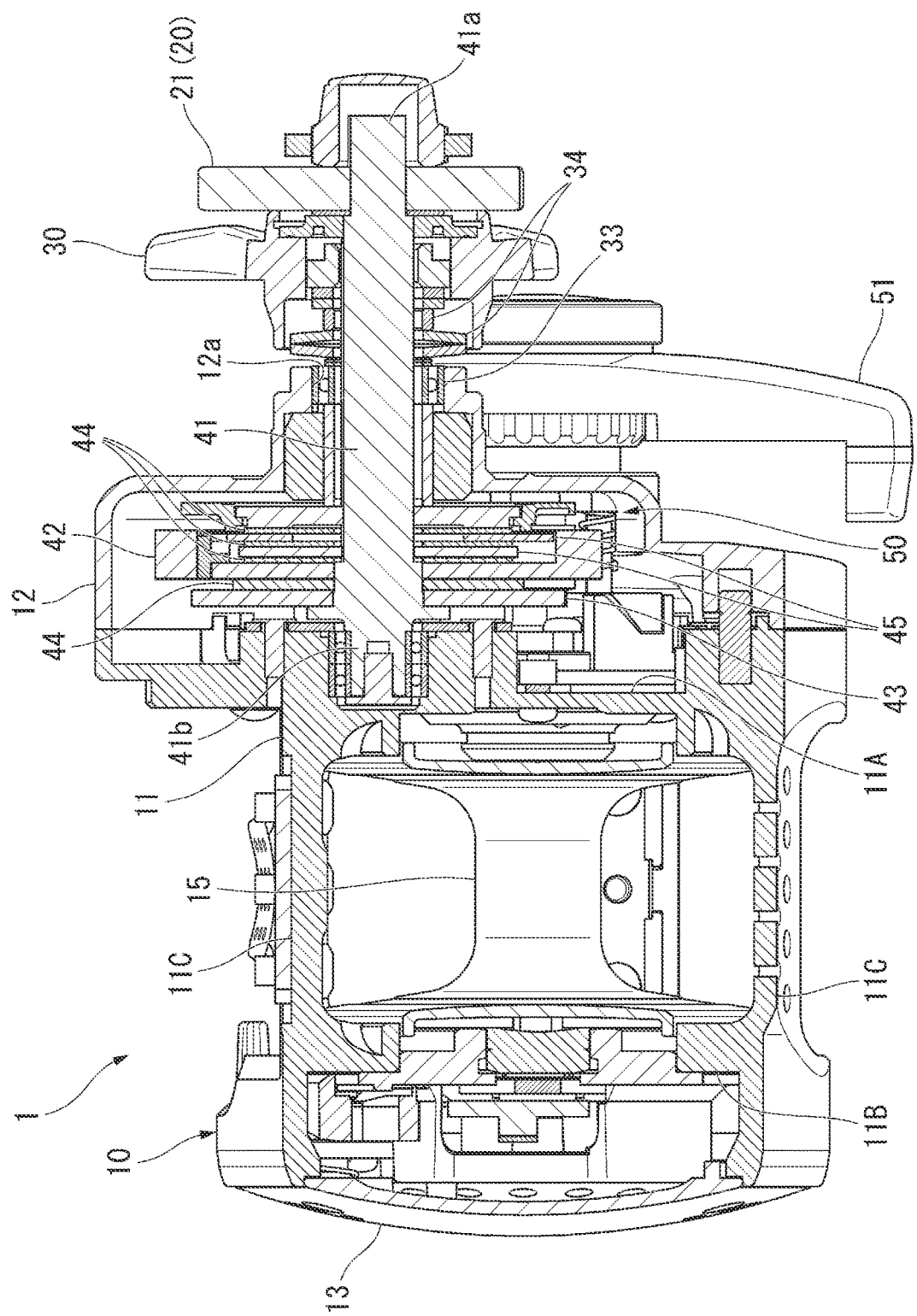
FIG. 2 is a cross-sectional view of the dual bearing reel, taken along line A-A shown in FIG. 1.

As shown in FIGS. 1 and 2, a drag washer 44 according to an embodiment of the present invention is employed, for example, in a dual bearing reel 1 (fishing reel) which is a medium-sized round reel.

<Overall Configuration>

The dual bearing reel 1 includes a reel body 10, a handle assembly 20 disposed on the side of the reel body 10 for spool rotation, and a star drag 30 disposed on the reel body 10 side of the handle assembly 20. A spool 15, which delivers and winds a fishing line by rotating, is rotatably attached to the reel body 10. The reel body 10 is attached to a fishing rod via a rod-attaching part.

Here, in the following description, the term "left-right direction" refers to the left-right direction as seen by a user who holds the fishing rod equipped with the dual bearing reel 1 while fishing. In this embodiment, the handle assembly 20 is located on the right side of the reel body 10.

The handle assembly 20 includes a crank arm 21 and a handle grip 22. The crank arm 21 is unrotatably attached to a distal end 41a of a main gear shaft 41 (described below) protruding to the right side of the reel body 10. The handle grip 22 is attached to one end of the crank arm 21 so as to be rotatable around the axis in the direction perpendicular to one end of the crank arm 21.

The reel body 10 includes a frame 11, a right side cover 12, and a left side cover 13. The frame 11 includes a right side plate 11A, a left side plate 11B, and a plurality of connecting members 11C. The right side plate 11A and the left side plate 11B are arranged at a predetermined interval. The plurality of connecting members 11C connect the right side plate 11A and the left side plate 11B. The right side cover 12 is integrally formed with the right side plate 11A so as to cover the outside of the right side plate 11A. The left side cover 13 is fixed onto the left side plate 11B so as to cover the outside of the left side plate 11B. A space for housing various mechanisms described below is formed between the right side plate 11A and the right side cover 12.

The right side plate 11A and the right side cover 12, when viewed from the side, have a substantially elliptical shape expanding outwardly in the axial direction with the attaching part of the main gear shaft 41 (described below) at the center. The left side plate 11B and the left side cover 13, when viewed from the side, have a circular shape.

The plurality of connecting members 11C are plate-shaped members integrally formed with the right side plate 11A and the left side plate 11B. The plurality of connecting members 11C connect the right side plate 11A and the left side plate 11B at three points including the upper part, the lower part, and the rear part of the reel body 10. By providing such connecting members 11C, deformation such as flexure hardly occurs even when high load is applied to the reel body 10, and the decrease in winding efficiency is suppressed. A rod-attaching leg is fixed onto the connecting member 11C at the lower part, and a synthetic resin thumb rest 14 for holding the reel together with the fishing rod is equipped on the connecting member 11C at the rear part.

The spool 15 is rotatably disposed between the right side plate 11A and the left side plate 11B. A spool shaft (not shown) is fixed to penetrate through the center of the spool 15. The spool shaft is rotatably supported by the right side plate 11A and the left side plate 11B via bearings.

A rotation transmission mechanism 40 and a clutch mechanism 50 are disposed in the space between the right side plate 11A and the right side cover 12. The rotation transmission mechanism 40 transmits torque from the handle assembly 20 to the spool 15. The clutch mechanism 50 is provided inside the rotation transmission mechanism 40.

The rotation transmission mechanism 40 has a function to regulate torque when torque is transmitted in reverse from the spool 15 to the handle assembly 20 side. Additionally, a centrifugal brake mechanism is disposed at the center part of the left side plate 11B to brake the spool 15 from freely rotating in a line delivery direction. The rotation transmission mechanism 40 includes the main gear shaft 41 (a rotation shaft) in which the handle assembly 20 is fixed onto at one end (the distal end 41a) of the main gear shaft 41, a main gear 42 connected to the other end (a base end 41b) of the main gear shaft 41, and a pinion gear (not shown) that meshes with the main gear 42. The main gear 42 has a gear 42a on the outer periphery and rotatably attached to the main gear shaft 41. The pinion gear constitutes the rotation transmission mechanism 40 and also functions as the clutch mechanism 50.

The main gear shaft 41 is arranged parallel to the spool shaft, and rotatably supported by the right side plate 11A on one end side. The main gear 42 is connected to one end side of the main gear shaft 41 so as to integrally rotate. In this configuration, torque from the handle assembly 20 is directly transmitted to the spool 15 in a state in which the clutch mechanism 50 is on.

The clutch mechanism 50 includes a meshing groove arranged on a part of the above-described cylindrical pinion gear that is slidably attached to the outer periphery of the spool shaft, and a clutch pin (not shown) disposed to the spool shaft. In the clutch mechanism 50, the pinion gear slides along the spool shaft to engage the meshing groove with the clutch pin, thereby a rotational force is transmitted between the spool shaft and the pinion gear. This state is a connected state (clutch-on state). When the meshing groove and the clutch pin are disengaged, a rotational force is not transmitted between the spool shaft and the pinion gear. This state is a disconnected state (clutch-off state). In the clutch-off state, the spool 15 rotates freely. The pinion gear is biased in the direction, that is, clutch-on state, in which the meshing groove and the clutch pin are engaged by a clutch operation part 51 disposed on the outside of the right side cover 12. As such, the clutch operation part 51 is to operate the clutch mechanism 50 on and off.

Figure 3:
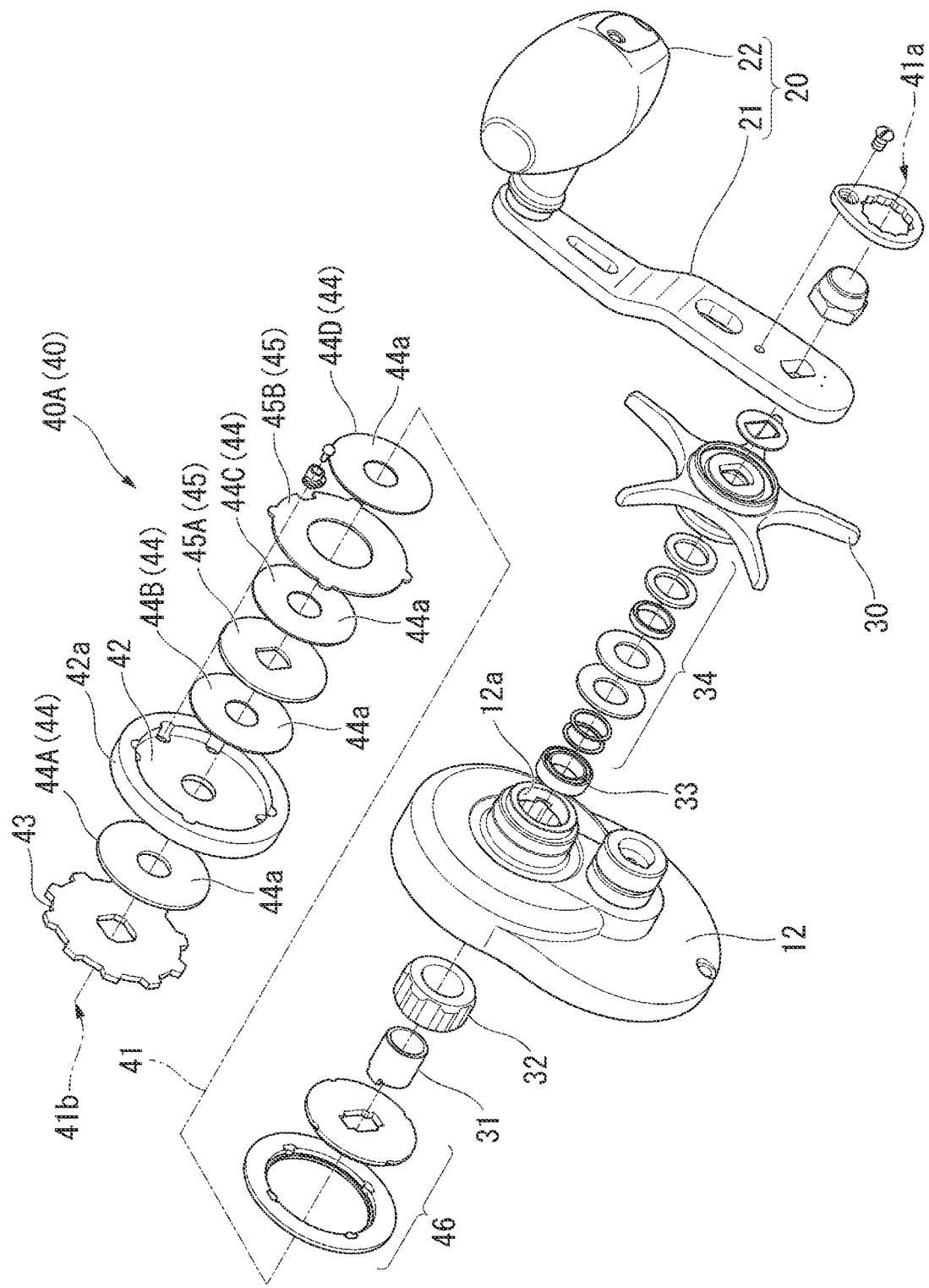
FIG. 3 is an exploded perspective view of a rotation transmission mechanism.

Next, a drag mechanism 40A disposed in the rotation transmission mechanism 40 will be specifically described based on FIG. 3.

FIG. 3 is an exploded perspective view in which the parts including the handle assembly 20, the star drag 30, and the drag mechanism 40A are disassembled along the main gear shaft 41 (the single dotted line shown in FIG. 3). The main gear shaft 41, shown with the single dotted line, is inserted through all of the parts shown in FIG. 3.

The drag mechanism 40A is provided with a stopper gear 43, a first drag washer 44A (44), the main gear 42, a second drag washer 44B (44), a first plate washer 45A (45), a third drag washer 44C (44), a second plate washer 45B (45), a fourth drag washer 44D (44), and a star drag plate 46, stacked in the axial direction of the main gear shaft 41 in order from the base end 41b to the distal end 41a of the main gear shaft 41. The stopper gear 43, the first plate washer 45A, the second plate washer 45B, and the star drag plate 46 are respectively thin metal plates and unrotatably attached to the main gear shaft 41.

The four drag washers 44A-44D are respectively arranged so as to be sandwiched between the metal plates such as the plate washers 45 or the like (including the main gear 42), as described above. For example, the first drag washer 44A is sandwiched between the metal stopper gear 43 and the metal main gear 42. Also, the third drag washer 44C is sandwiched between the metal first plate washer 45A and the metal second plate washer 45B. With the drag mechanism 40A, due to the frictional force on both surfaces (the sliding surfaces 44a) of each drag washer 44, the rotational force is transmitted from the handle assembly 20 to the spool 15, which achieves drag performance.

Additionally, on the base end side of the star drag plate 46, a tube 31, a nut 32, a bearing 33, and a plurality of washers 34 are provided so as to be stacked in the axial direction of the main gear shaft 41 in order from the base end 41b to the distal end 41a of the main gear shaft 41. The parts from the stopper gear 43 on the distal end side to the bearing 33 are housed in the right side cover 12. The plurality of the washers 34 are housed in the shaft part of the star drag 30. As shown in FIG. 2, the bearing 33 is inserted into an insertion hole 12a of the main gear shaft 41 of the right side cover 12.

In the dual bearing reel 1 configured in this manner, the force from the handle assembly 20 is transmitted in the order as follows; the handle assembly 20, the main gear shaft 41, the drag washers 44, the main gear 42, the pinion gear (not shown), the spool 15 (clutch-on state). When the fishing line is intensely pulled in the line delivery direction, force exceeding the clamping force (frictional force) of the drag is applied on the main gear 42, and thus, the force acts in the order of the spool 15, the pinion gear, the main gear 42. In this case, sliding occurs among the main gear 42, the drag washers 44, the stopper gear 43, and the plate washers 45 and the fishing line is delivered.

Figure 4:
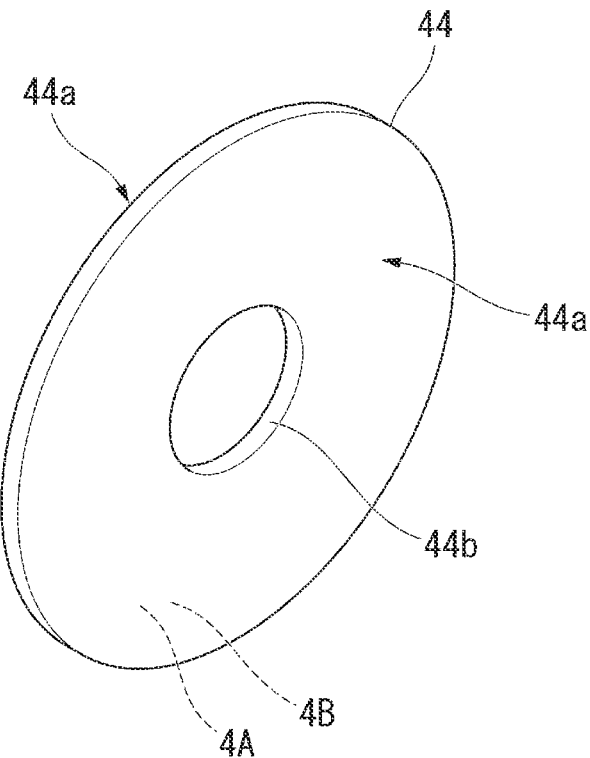
FIG. 4 is a perspective view of a drag washer.

As shown in FIGS. 3 and 4, the drag washers 44 (44A, 44B, 44C, 44D) have insertion holes 44b in the center, though which the main gear shaft 41 can be inserted. By rotating relative to the plate washers 45, the bearing surfaces become the sliding surfaces 44a. In other words, the sliding surfaces 44a are slidable relative to the plate washers 45.

Figure 5:
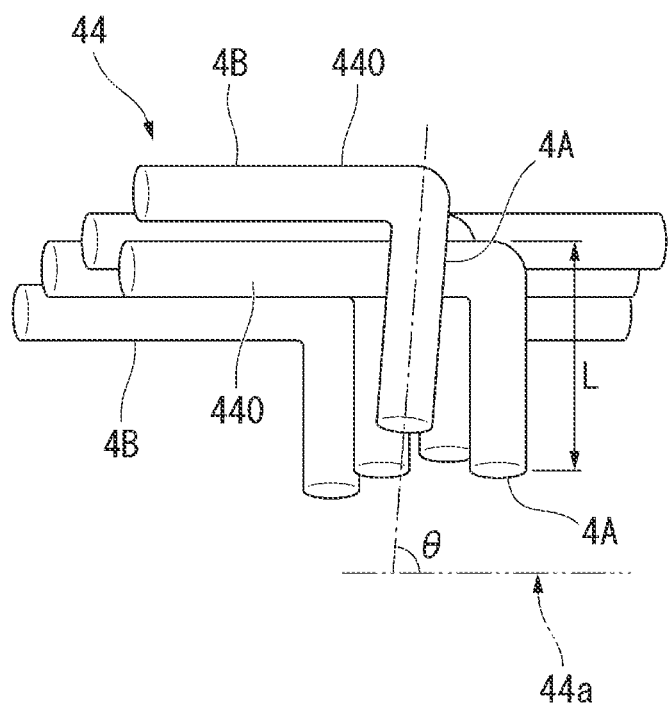
FIG. 5 is a perspective view of the configuration of vertical fibers and horizontal fibers inside the drag washer.
Figure 6:
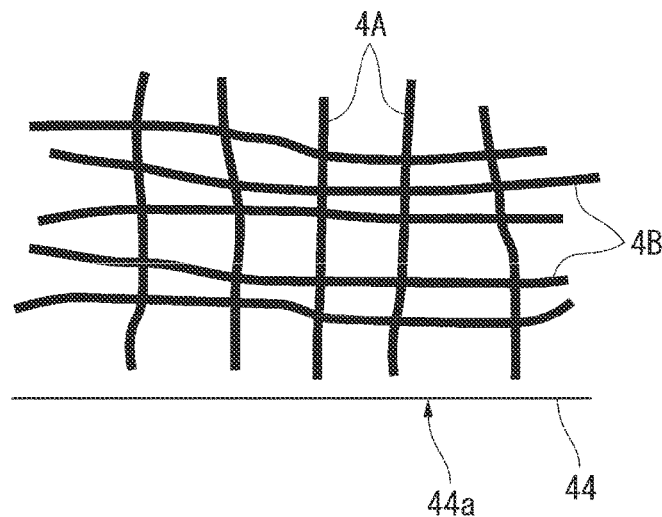
FIG. 6 is a side view of the configuration of the vertical fibers and the horizontal fibers, showing the pre-worn condition.

As shown in FIGS. 4, 5, and 6, the drag washers 44 are provided with a number of the same fibers 440 each of which includes a vertical fiber 4A (the first fiber) and a horizontal fiber 4B (the second fiber). A single fiber 440 constituting the drag washer 44 is bent at an angle θ of, for example, 60° to 90°, as described above. One bent vertical fiber 4A is arranged in the fiber length direction of the vertical fiber 4A to extend in the direction along the main gear shaft 41 or along a thickness of each drag washer 44. Another horizontal fiber 4B is arranged in the fiber length direction of the horizontal fiber 4B along each sliding surface 44a or approximately parallel to the plane direction of the sliding surface 44a. In other words, the vertical fiber 4A is arranged vertically to the sliding surface 44a, and the horizontal fiber 4B is arranged horizontally along the sliding surfaces 44a. As shown in FIG. 5, the plurality of fibers 440 entwine with each other, with the vertical fiber 4A of one fiber 440 entwining with the horizontal fiber 4B of another fiber 440 to form the felt material.

Such one single fiber 440 forming the vertical fiber 4A and the horizontal fiber 4B can be formed by entwining the same fibers in the thickness direction of the drag washer 44 by the needle-punch method, for example. Also, the one fiber may include the vertical fiber 4A and the horizontal fiber 4B, or the one fiber may be cut into the vertical fiber 4A and the horizontal fiber 4B in the manufacturing process.

Also, for the felt material of the drag washers 44 in this embodiment, wool with the density of 0.35 g/cm$^3$ or more and 0.8 g/cm$^3$ or less is employed. In the felt material with the density in this range (0.35 g/cm$^3$ or more and 0.8 g/cm$^3$), the vertical fibers 4A and the horizontal fibers 4B sufficiently entwine with each other, and thus, the felt material can be made durable. If the density of the felt material exceeds 0.8 g/cm$^3$, the felt material becomes stiff and the cushioning performance decreases.

The length L of the vertical fibers 4A in the fiber length direction is 0.5 mm or more and preferably 0.8 mm or more. More preferably, the length L of the vertical fibers 4A is 0.8 mm or more and 1.5 mm or less. If the length L of the vertical fibers 4A is shorter than 0.5 mm, the vertical fibers 4A cannot be sufficiently linked with the horizontal fibers 4B, therefore, the vertical fibers 4A and the horizontal fibers 4B do not entwine with each other. If the length L of the vertical fibers 4A is longer than 0.8 mm, the vertical fibers 4A and the horizontal fibers 4B even more easily entwine with each other. Furthermore, if the length L of the vertical fibers 4A exceeds 1.5 mm, the thickness of the drag washer 44 itself increases and the length of the drag mechanism in the axial direction (axial direction of the main gear shaft 41) becomes too long.

Also, in the drag washer 44, the angle θ of the fiber length direction of each vertical fiber 4A to the sliding surface 44a is within a range of 60° to 90°. If the angle θ of the vertical fibers 4A is less than 60°, the vertical fibers 4A is close to the plane direction of the sliding surface 44a, resulting in insufficient entanglement with the horizontal fibers 4B. Thus, it becomes difficult to improve the strength as the drag washer 44. In addition, the fiber length direction (first direction) of each vertical fiber 4A is inclined relative to the fiber length direction (second direction) of each horizontal fiber 4B. The angle of the first direction to the second direction is within a range of 60° to 90°.

For example, the ratio of the vertical fibers 4A to the entire drag washer 44 is 3% or more, and preferably, 5% or more. If the ratio of the vertical fibers 4A is less than 3%, sufficient durability required as the drag washer 44 cannot be obtained. Also, the modulus of vertical elasticity becomes larger as the vertical fibers 4A increases, resulting in carbon washer-like behavior. Therefore, it is preferable that the upper limit of the ratio of the vertical fibers 4A is approximately 30%, for example.

Figure 7:
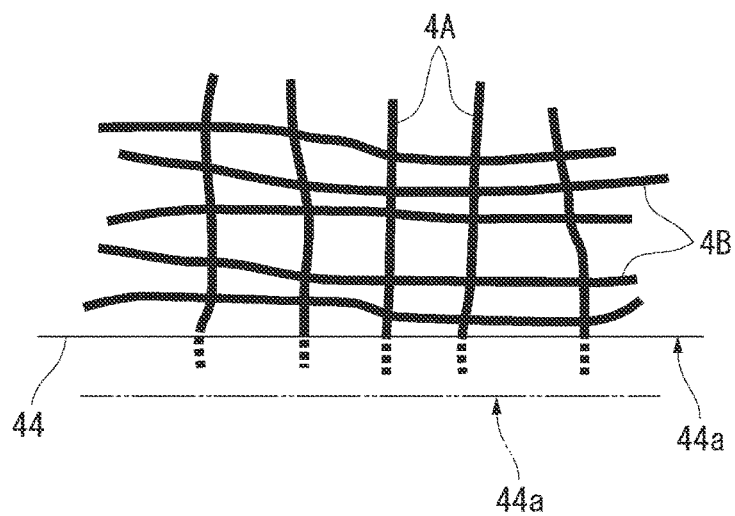
FIG. 7 is a side view of the configuration of the vertical fibers and the horizontal fibers, showing the worn condition.

As shown in FIG. 7, the drag washer 44 of this embodiment is worn due to the friction associated with sliding on the sliding surfaces 44a. However, since the vertical fibers 4A exist, the shedding of the horizontal fibers 4B can be less frequent, and thus, the durability can be improved.

Figure 8:
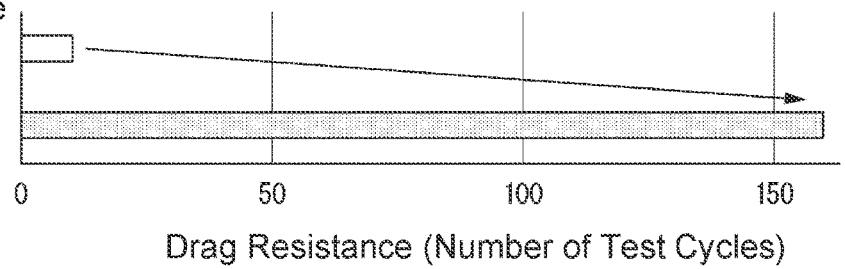
FIG. 8 is a chart showing drag resistance according to the number of test cycles.

Here, in FIG. 8, the drag resistance (number of test cycles), which is the effect of the drag washer 44 of this embodiment, is shown in the comparative example and the working example according to this embodiment. The number of test cycles in the comparative example is around 10 times, whereas the number of test cycles in the working example exceeds 150 times. That is, it is confirmed that the drag resistance in the working example is 10 times more than the drag resistance in the comparative example. Incidentally, 10 test cycles are the same as the application of load which is approximately equal to the continuation of fishing trips for one year by a user for fishing in which relatively high drag force is maintained.

Next, the operation of the drag washer and the fishing reel configured in this manner will be described in detail based on the drawings.

As shown in FIGS. 5 and 6, in the drag washer 44 according to this embodiment, not only the horizontal fibers 4B arranged along the sliding surfaces 44a, but also the vertical fibers 4A intersecting with the horizontal fibers 4B are provided, and the vertical fibers 4A and the horizontal fibers 4B with different fiber length directions entwine with each other and form the felt material. Therefore, the fiber density can be increased in all direction, not only in the direction along the sliding surfaces 44a. For that reason, even when high load is applied to the sliding surfaces 44a by the star drag 30, wear against shear can be suppressed and the occurrence of breakage and damage can be reduced, thereby improving the durability as the drag washer 44.

Specifically, compared to the conventional drag washer in which fibers on the sliding surfaces 44a come off due to sliding as seen in the conventional case having only the horizontal fibers 4B arranged horizontally along the sliding surfaces 44a, the drag washer 44 of this embodiment is formed by entwining the vertically arranged vertical fibers 4A with the horizontally arranged horizontal fibers 4B, and thus, shedding of the horizontal fibers 4B associated with sliding can be reduced and the durability can be improved.

Also, the drag washer 44 according to this embodiment has the performance of a felt material, in which fine adjustment is possible by gradually adapting the braking force in relation to the pressing force. Moreover, the cost can be reduced, compared to components such as a carbon cloth washer made of carbon fiber woven fabric, for example.

Additionally, in this embodiment, by using the vertical fibers 4A with the length of 0.5 mm or more in the fiber length direction, the vertical fibers 4A are easy to entwine with the horizontal fibers 4B and the suitable felt material with excellent durability can be formed.

Furthermore, in this embodiment, by making the length of the vertical fibers 4A in the fiber length direction 0.8 mm or more and 1.5 mm or less, the suitable felt material with even greater durability can be formed.

Additionally, in this embodiment, the angle of the fiber length direction of the vertical fibers 4A to the sliding surfaces 44a is within the range of 60° to 90°, therefore, the vertical fibers 4A entwine more easily with the horizontal fibers 4B, and thus, the durability as the felt material can be more reliably demonstrated.

Furthermore, in this embodiment, the vertical fibers 4A have higher strength than the horizontal fibers 4B, and the fiber direction of the vertical fibers 4A intersect with the sliding direction. Therefore, it is possible to compose the felt material with high durability, capable of suppressing wear by increasing the strength of the vertical fibers 4A, effective in shearing during sliding.

Also, in this embodiment, the vertical fiber 4A and horizontal fiber 4B are formed of the same fiber, and the felt material can be easily manufactured by entwining the same fibers in the thickness direction by the needle-punch method, for example.

In addition, in the drag washer 44 in this embodiment, the density of the felt material is 0.35 $g/cm^3$ or more and 0.8 $g/cm^3$ or less, and thus, it is possible to improve the wear resistance during sliding. Moreover, since the density of the felt material is 0.8 $g/cm^3$ or less, the felt material does not become too hard and it is possible to ensure the cushioning performance.

With the drag washer 44 and the dual bearing reel 1 according to this embodiment, configured as described above, it is possible to achieve high durability and to ensure braking force suitable for fishing drag, and additionally to reduce the cost.

The above-described embodiment of the drag washer and the fishing reel according to the present invention is explained as an example and is not intended to limit the scope of the invention. The embodiment can be implemented in various other forms, and various omissions, substitutions, and changes can be made to the extent that they do not depart from the gist of the invention. Embodiments and variations thereof include, for example, those that can be readily assumed, those that are substantially identical, and those that are of equal scope.

For example, in this embodiment, the length of the vertical fibers 4A in the drag washer 44 in the fiber length direction is 0.5 mm or more, and more preferably 0.8 mm or more and 1.5 mm or less. However, it is not limited to these numerical ranges.

Also, the angle of the fiber length direction of the vertical fibers 4A to the sliding surfaces 44a is not limited to the range of 60° to 90°, as described in the above embodiment. It is important that the vertical fibers 4A and the horizontal fibers 4B intersect with each other.

Additionally, in this embodiment, the vertical fibers 4A have higher strength than the horizontal fibers 4B. However, it is not limited to this configuration and the vertical fibers 4A and the horizontal fibers 4B may have the same strength. For example, when the vertical fibers 4A and the horizontal fibers 4B are configured of one same fiber, each of them has the same strength.

Additionally, for the drag washer of this embodiment, the density of the felt material is 0.35 $g/cm^3$ or more and 0.8 $g/cm^3$ or less. However, it is not limited to the felt material with such density.

Figure 9:
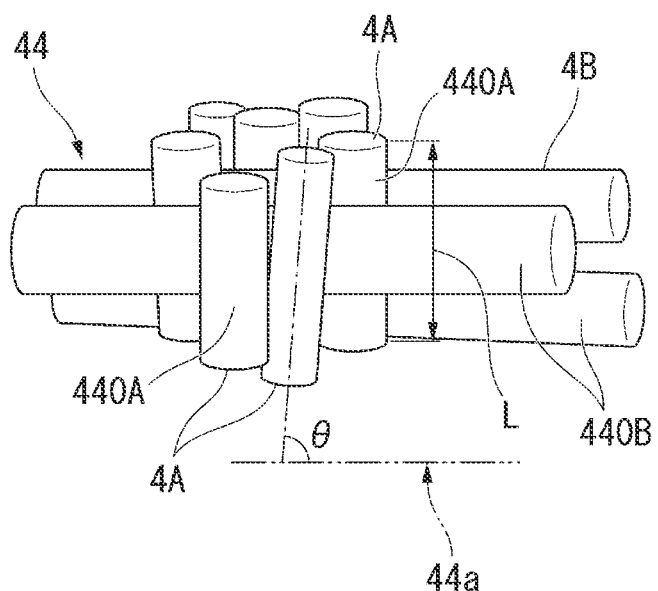
FIG. 9 is a perspective view of the configuration of vertical fibers and horizontal fibers inside the drag washer according to a modified example.

Moreover, in this embodiment, the fiber constituting the drag washer 44 is one fiber 440 bent to form the vertical fiber 4A and the horizontal fiber 4B. However, it is not limited to such a bent shape. For example, as shown in FIG. 9, the first fiber 440A, having the fiber length direction which extends along the rotation shaft (the main gear shaft 41) and the second fiber 440B, having the fiber length direction which extends along the sliding surface 44a may be separate fibers rather than being one fiber.

Furthermore, in the embodiment described above, as a fishing reel, a dual bearing reel which is a medium-sized round reel is used as an example of application of the drag washer. However, it is not limited for the reel to be a dual bearing reel and it is possible to apply to a spinning reel, for example.

REFERENCE SIGNS LIST

1 Dual bearing reel (fishing reel)
4A Vertical fiber (first fiber)
4B Horizontal fiber (second fiber)
10 Reel body
15 Spool
20 Handle assembly 30 Star drag
40 Rotation transmission mechanism
40A Drag mechanism
41 Main gear shaft (rotation shaft)
42 Main gear
44 (44A-44D) Drag washer
44a Sliding surface
45 (45A, 45B) Plate washer
50 Clutch mechanism
440 Fiber
440A First fiber
440B Second fiber

What is claimed is:

1. A drag washer for a fishing reel, having a sliding surface slidable relative to a plate washer, the drag washer comprising:
   a felt material formed by entwining a first fiber and a second fiber,
   the first fiber extending in a first direction along a thickness of the drag washer, and
   the second fiber extending in a second direction along the sliding surface.

2. The drag washer according to claim 1, wherein
the first fiber is arranged vertically to the sliding surface, and
the second fiber is arranged horizontally along the sliding surfaces.

3. The drag washer according to claim 1, wherein
a length of the first fiber is 0.5 mm or more.

4. The drag washer according to claim 3, wherein
the length of the first fiber is 0.8 mm or more.

5. The drag washer according to claim 4, wherein
the length of the first fiber is 1.5 mm or less.

6. The drag washer according to claim 1, wherein
an angle of the first direction to the sliding surface is in a range of 60° to 90°.

7. The drag washer according to claim 1, wherein
the first direction is inclined relative to the second direction.

8. The drag washer according to claim 7, wherein
an angle of the first direction to the second direction is in a range of 60° to 90°.

9. The drag washer according to claim 1, wherein
a strength of the first fiber is higher than a strength of the second fiber.

10. The drag washer according to claim 1, wherein
the first fiber and the second fiber are formed as one single fiber.

11. The drag washer according to claim 10, wherein
the first fiber is bent relative to the second fiber.

12. The drag washer according to claim 1, wherein
the first fiber and the second fiber are separate fibers intersecting with each other.

13. The drag washer according to claim 1, wherein
the felt material is wool with a density of 0.35 g/cm$^3$ or more and 0.8 g/cm$^3$ or less.

14. A fishing reel, wherein
the drag washer according to claim 1 is used.

* * * * *